(12) United States Patent
Kuo et al.

(10) Patent No.: US 8,064,201 B2
(45) Date of Patent: Nov. 22, 2011

(54) SECURING DEVICE AND THERMAL MODULE INCORPORATING THE SAME

(75) Inventors: Po-Hsuan Kuo, Taipei Hsien (TW); Chih-Hsun Lin, Taipei Hsien (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 220 days.

(21) Appl. No.: 12/494,330

(22) Filed: Jun. 30, 2009

(65) Prior Publication Data

US 2010/0238631 A1 Sep. 23, 2010

(30) Foreign Application Priority Data

Mar. 21, 2009 (CN) .......................... 2009 1 0301030

(51) Int. Cl.
*H05K 7/20* (2006.01)
*F28F 7/00* (2006.01)
*H01L 23/34* (2006.01)
*A44B 11/25* (2006.01)

(52) U.S. Cl. ... 361/700; 361/697; 361/703; 361/679.47; 361/679.52; 165/104.33; 165/80.4; 165/80.5; 257/715; 257/719; 257/722; 174/15.2; 174/16.3; 24/453; 24/458; 24/459; 24/520

(58) Field of Classification Search .......... 361/696–697, 361/700, 703, 704, 709, 711, 719, 679.47, 361/679.48, 679.52, 679.54; 165/80.2–80.5, 165/104.55, 185; 257/713–715, 719, 722, 257/E23.088; 174/15.2, 16.3, 252; 24/453, 24/458, 459, 520
See application file for complete search history.

(56) References Cited

U.S. PATENT DOCUMENTS

| | | | |
|---|---|---|---|
| 7,086,458 B2 * | 8/2006 | Chen et al. ........... | 165/185 |
| 7,697,288 B2 * | 4/2010 | Okutsu ................ | 361/695 |
| 7,855,889 B2 * | 12/2010 | Hung et al. .......... | 361/700 |
| 2008/0068797 A1 * | 3/2008 | Ikubo .................. | 361/695 |
| 2009/0201646 A1 * | 8/2009 | Yang et al. .......... | 361/704 |
| 2010/0296251 A1 * | 11/2010 | Chen et al. .......... | 361/700 |

* cited by examiner

*Primary Examiner* — Zachary M Pape
(74) *Attorney, Agent, or Firm* — Altis Law Group, Inc.

(57) ABSTRACT

A thermal module includes a fin assembly, a heat spreader, a heat pipe connected between the fin assembly and the heat spreader, and a securing plate. The securing plate has at least three resilient members secured on a bottom surface thereof. Each of the resilient members has a capability to deform resiliently along a direction perpendicular to the bottom surface of the securing plate to resiliently press the heat spreader to an electronic component.

19 Claims, 7 Drawing Sheets

SECURING DEVICE AND THERMAL MODULE INCORPORATING THE SAME

BACKGROUND

1. Technical Field

The present disclosure relates to securing devices, and more particularly to a securing device for securing a thermal module onto an electronic component without risking damaging the electronic component.

2. Description of Related Art

With continuing development of the electronic technology, electronic components such as CPUs (central processing units) generate more and more heat required to be dissipated immediately. Therefore, thermal modules are widely used to help dissipating heat of the electronic components. A typical thermal module includes a heat sink, a heat pipe and a heat dissipating fan. The heat pipe has an evaporation section attached to the electronic component to absorb heat therefrom, and a condensation section attached to the heat sink to transfer heat thereto. The heat sink is located at an air outlet of the heat dissipating fan. The heat dissipating fan generates airflow which flows through the heat sink to take away heat therefrom.

In assembly of the thermal module, the evaporation section of the heat pipe is received in a groove of a heat spreader. The heat spreader is a rectangular plate made of thermal conductive material. The heat spreader is screwed to a printed circuit board on which the electronic component is mounted thus to secure the evaporation section of the heat pipe onto the electronic component. However, because it is difficult to control a proper force exerted on the heat spreader, so excess force is always exerted on the heat spreader and thus risks damaging the electronic component.

For the said reasons, a thermal module which can overcome the described shortcoming is desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
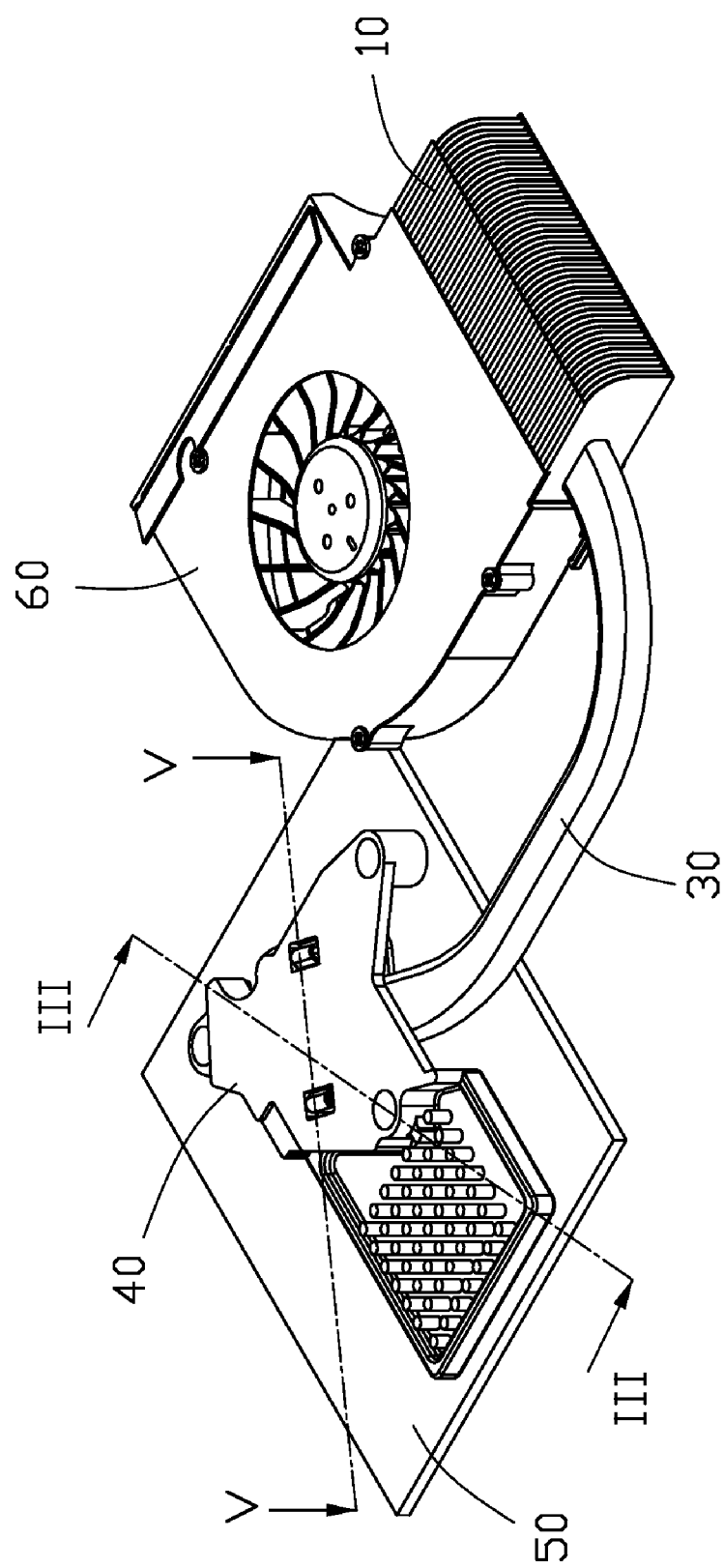
FIG. 1 is an assembled, isometric view of a thermal module according to a first embodiment of the present disclosure.
Figure 2:
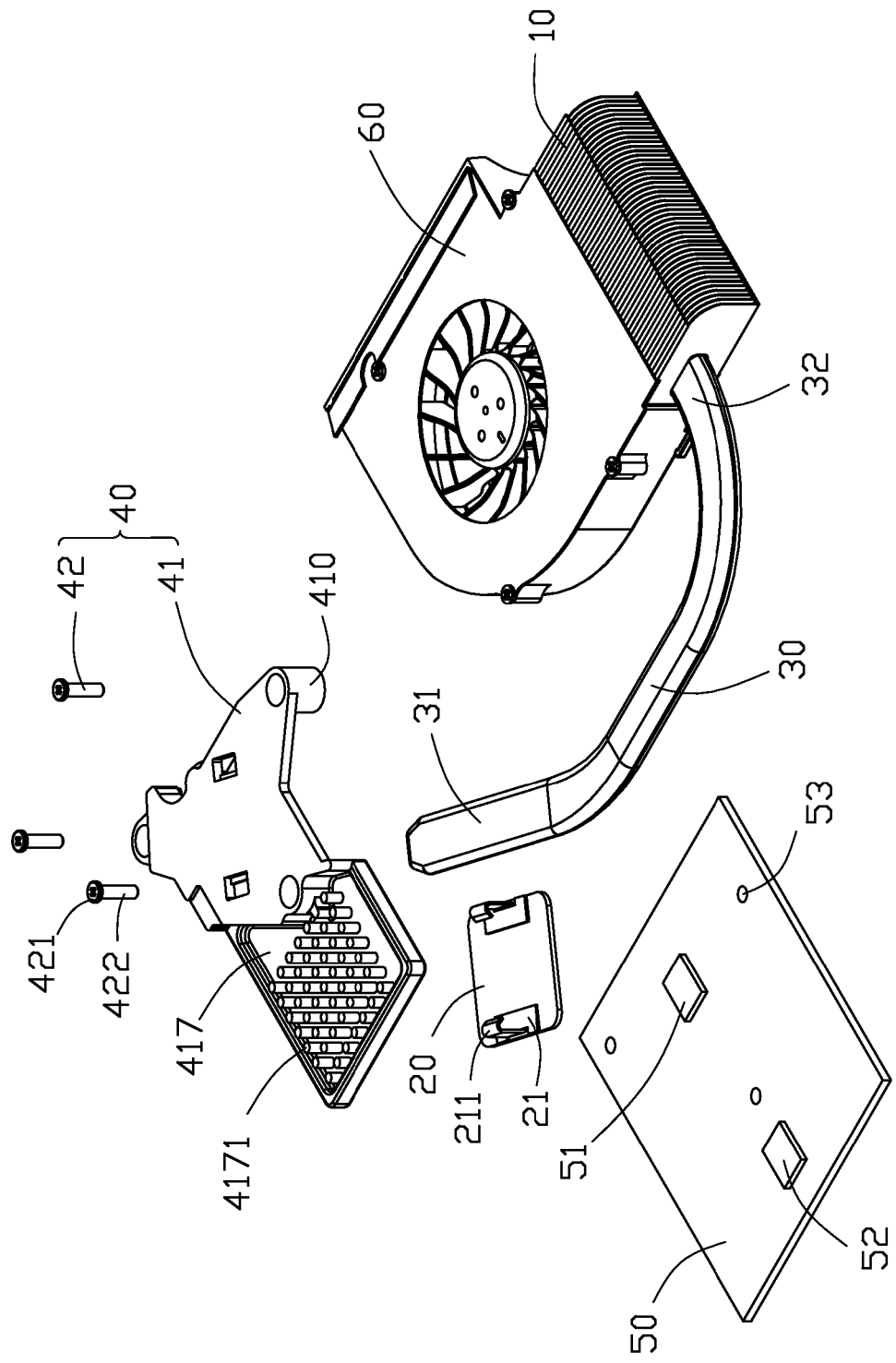
FIG. 2 is an exploded, isometric view of the thermal module of FIG. 1.

Referring to FIGS. 1 and 2, a thermal module according to a first embodiment of the present invention is shown. The thermal module is used for cooling electronic components 51, 52 such as CPU, north bridge, etc. which are mounted on a printed circuit board (PCB) 50.

The thermal module includes a fin assembly 10, a heat spreader 20, a flat-type heat pipe 30 connecting between the fin assembly 10 and the heat spreader 20, a securing device 40 for securing the thermal module onto the PCB 50, and a centrifugal blower 60 mounted on the fin assembly 10.

The heat spreader 20 is a rectangular plate made of a thermal conductive material, such as copper, aluminum, etc. Two clasping flakes 21 are formed at two opposite lateral sides of the heat spreader 20, respectively. Each of the clasping flakes 21 extends upwardly from a lateral side of the heat spreader 20 and then bends downwardly slantways towards a middle portion of the heat spreader 20 to form a hook 211 at a free end thereof. The two hooks 211 can deform resiliently. The heat pipe 30 includes an evaporation section 31 and a condensation section 32 at two opposite ends thereof, respectively. The evaporation section 31 is positioned between the two clasping flakes 21 with a bottom surface thereof secured on a top surface of the heat spreader 20. The securing device 40 is secured on the PCB 50 to press the heat spreader 20 onto the electronic component 51; thus, the evaporation section 31 is thermally connected to the electronic component 51 via the heat spreader 20 to absorb heat from the electronic component 51. The condensation section 32 extends through the fin assembly 10 to transfer heat thereto. The fin assembly 10 is located at an air outlet of the centrifugal blower 60. The centrifugal blower 60 provides a cool airflow through the fin assembly 10 to take away heat therefrom.

Figure 3:
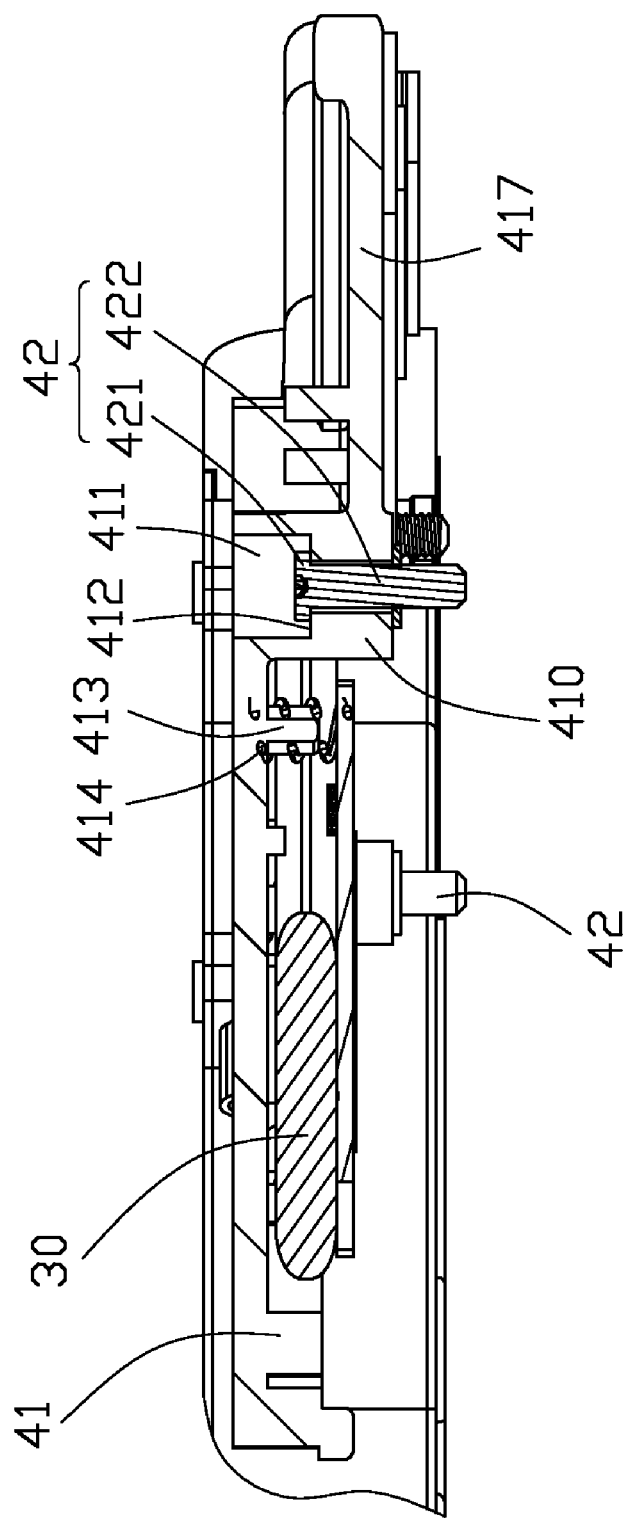
FIG. 3 is a cross-sectional view of the thermal module of FIG. 1, taken along line III-III thereof.
Figure 4:
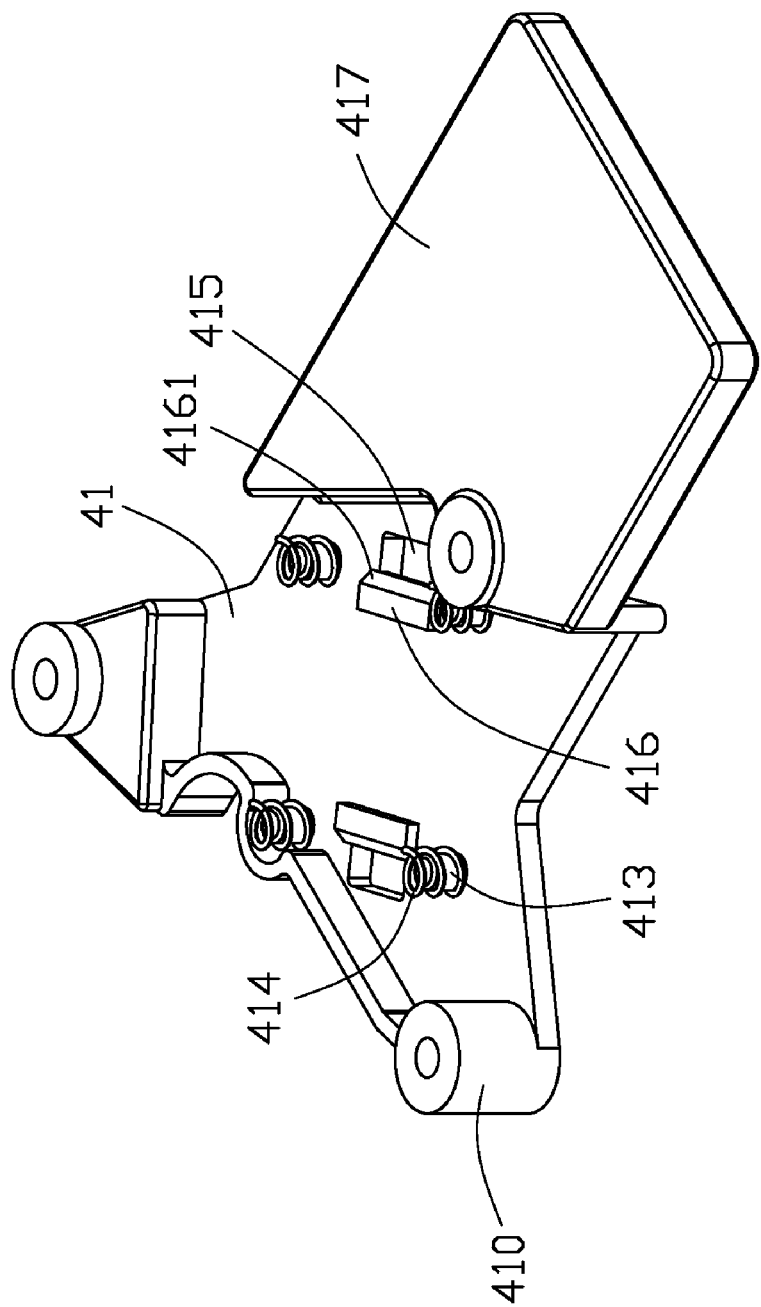
FIG. 4 is an isometric view of a securing plate of the thermal module of FIG. 2, viewed from a bottom aspect.
Figure 5:
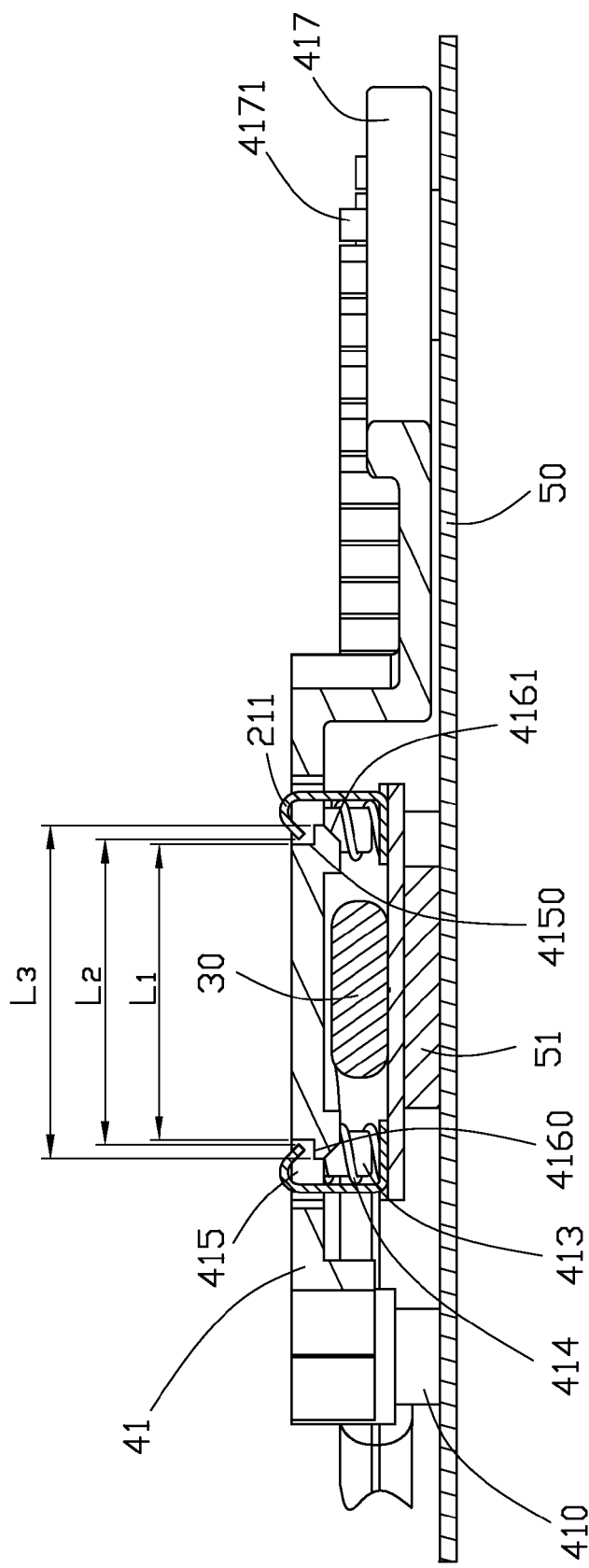
FIG. 5 is a cross-sectional view of the thermal module of FIG. 1, taken along line V-V thereof.

Referring to FIGS. 3, 4 and 5, the securing device 40 includes a securing plate 41 and a plurality of fasteners 42 securing the securing plate 41 onto the PCB 50. The securing plate 41 is approximately a triangular plate. Three sleeves 410 are formed at three corners of the securing plate 41, respectively. Each of the sleeves 410 extends perpendicularly downwardly from the securing plate 41 and defines a securing hole 411 therein. Bottom ends of the sleeves 410 abut against the PCB 50, and the PCB 50 defines three through holes 53 therein, corresponding to the securing holes 411 of the sleeves 410. An inner diameter of the securing hole 411 at the bottom end of each sleeve 410 is smaller than that of another portion of the securing hole 411. Therefore a step 412 is formed on an inner surface of the securing hole 411. The step 412 is located above the bottom end of the sleeve 410. Each of the fasteners 42 includes a cap 421 and a pole 422 extending downwardly from the cap 421. A diameter of the cap 421 is larger than that of the pole 422. When the fastener 42 extends into the corresponding securing hole 411 of the securing plate 41 and secures in the corresponding through hole 53 of the PCB 50, the cap 421 of the fastener 42 is blocked by the step 412, and thus exerts a securing force onto the securing plate 41 in a direction toward the PCB 50.

Four securing shafts 413 extend downwardly perpendicularly from a middle portion of a bottom surface of the securing plate 41. The securing shafts 413 are arranged at four corners of an imaginary rectangle, corresponding to four corners of the heat spreader 20. Each of the securing shafts 413 has a spring 414 coiled thereon. A top end of each spring 414 is fixed on the securing plate 41, and a bottom end of the spring 414 is free. The spring 414 at a free status is longer than each of the securing shafts 413, which ensures a deformation capability to the spring 414 along a direction perpendicular to the securing plate 41 when the securing plate 41 is pressed toward the PCB 50.

The securing plate 41 has two clasping holes 415 defined therein, corresponding to the two clasping flakes 21 of the heat spreader 20, for clasping the heat spreader 20 to the securing plate 41. Each of the clasping holes 415 has a rectangular shape. The two clasping holes 415 are parallel to each other. A distance $L_1$ between inner sides 4150 of the two clasping holes 415 is no more than a distance $L_2$ between the two hooks 211. Two clasping portions 416 are formed on the bottom surface of the securing plate 41. Each of the clasping portions 416 extends downwardly near the inner lateral side 4150 of a corresponding clasping hole 415 and then extends horizontally into the clasping hole 415. A horizontal clasping surface 4160 is formed at a top end of the clasping portion 416. The clasping surface 4160 is positioned in the clasping hole 415 and lower than an upper surface of the securing plate 41. A slantwise surface 4161 is formed at a free end of each of the clasping portions 416, located corresponding to one of the two hooks 211. The slantwise surface 4161 slants forth from a bottom end to the top end of the clasping portion 416. A distance $L_3$ between the free ends of the clasping portions 416 is a little more than the distance $L_2$ between the two hooks 211.

A heat dissipation plate 417 is formed at a lateral side of the securing plate 41. The heat dissipation plate 417 is parallel to the securing plate 41 and a little lower than the securing plate 41. A plurality of heat dissipation pins 4171 extend upwardly from heat dissipation plate 417. A height of the heat dissipation pin 4171 is less than a distance between the securing plate 41 and the heat dissipation plate 417, i.e., a top end of each heat dissipation pin 4171 is lower than the securing plate 41.

In pre-assembling the thermal module, the heat spreader 20 is arranged under the securing plate 41 with the clasping flakes 21 aligned with the clasping holes 415. Then the securing plate 41 is pressed downwardly to cause the hooks 211 of the clasping flakes 21 to deform and move along the slantwise surfaces 4161 and finally snappingly clasp the clasping surfaces 4160 of the clasping portions 416. Thus the heat spreader 20 is assembled to the securing plate 41. In this state, a distance between the securing plate 41 and the heat spreader 20 is smaller than a length of the spring 414 at a free status, but larger than a height of the heat pipe 30. The springs 414 are compressed between the bottom surface of the securing plate 41 and the top surface of the heat spreader 20. Free ends of the securing shafts 413 are spaced from the top surface of the heat spreader 20, and a top surface of the evaporation section 31 is spaced from the bottom surface of the securing plate 41, for a further compression of the springs 414.

In assembling the heat dissipation module onto the electronic components 51, 52, the heat spreader 20 and the heat dissipation plate 417 align with the electronic components 51, 52 respectively. Fasteners 42 extend through the securing holes 411 of the securing plate 41 into the through holes 53 of the PCB 50 to secure the securing plate 41 onto the PCB 50. The springs 414 are further compressed between the securing plate 41 and heat spreader 20 due to the securing force of the fasteners 42 to resiliently press the heat spreader 20 onto the electronic component 51. The free ends of the securing shafts 413 are spaced from the top surface of the heat spreader 20, and the top surface of the evaporation section 31 is spaced from the bottom surface of the securing plate 41, too, whereby the springs 414 still have a space to be further compressed to absorb an unexpected impact or vibration on the securing device 40. The springs 414 provide a resilient force, which causes a force exerted downwardly by the heat spreader 20 on the electronic component 51 to be modulated, thereby preventing a too excessive force from being exerted on the electronic component 51. Thus, the electronic component 51 is prevented from damage. In addition, the securing device 40 has fewer fasteners 42, and the printed circuit board 50 needs to form fewer through holes 53, which decreases circuit design difficulties of the printed circuit board 50 and reduces the production cost of the thermal module.

Figure 6:
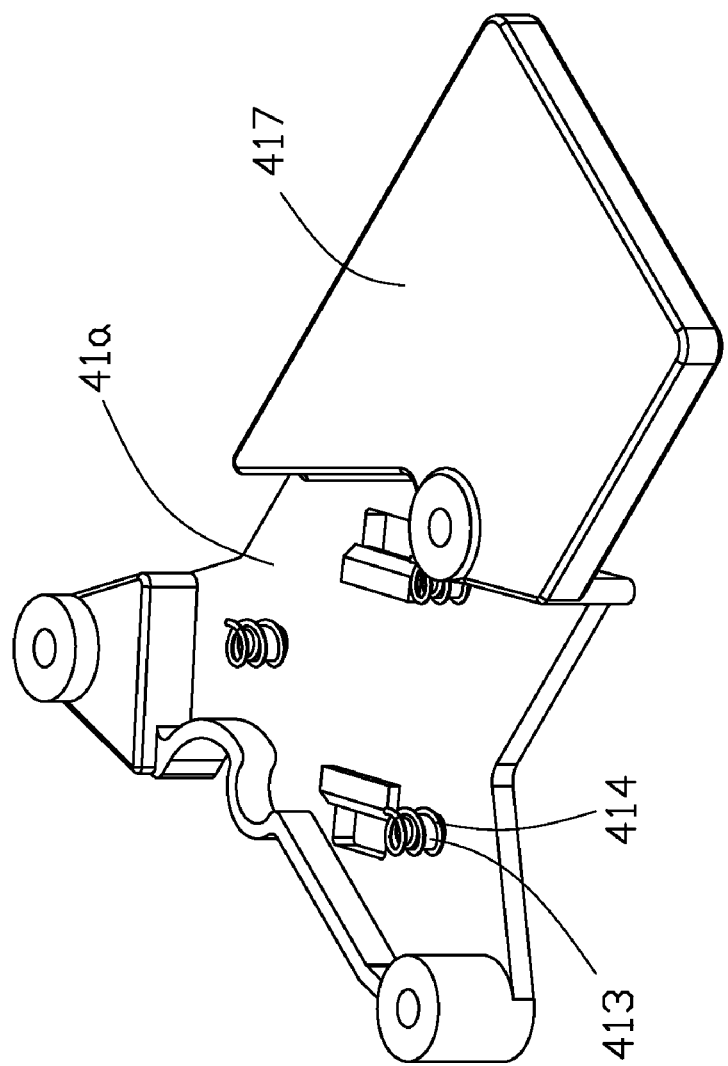
FIG. 6 is an isometric view of a securing plate of a thermal module according to a second embodiment of the present disclosure.

FIG. 6 shows a securing plate 41a of a thermal module according to a second embodiment of the present disclosure. The securing plate 41a is similar to the securing plate 41 in the previous embodiment. The difference is that, the securing plate 41a has three securing shafts 413 formed on a bottom surface thereof. The securing shafts 413 extend downwardly perpendicularly from the securing plate 41a and are arranged at three corners of an imaginary triangle. Each of the securing shafts 413 has a spring 414 coiled thereon. The spring 414 at a free status is longer than the securing shaft 413.

Figure 7:
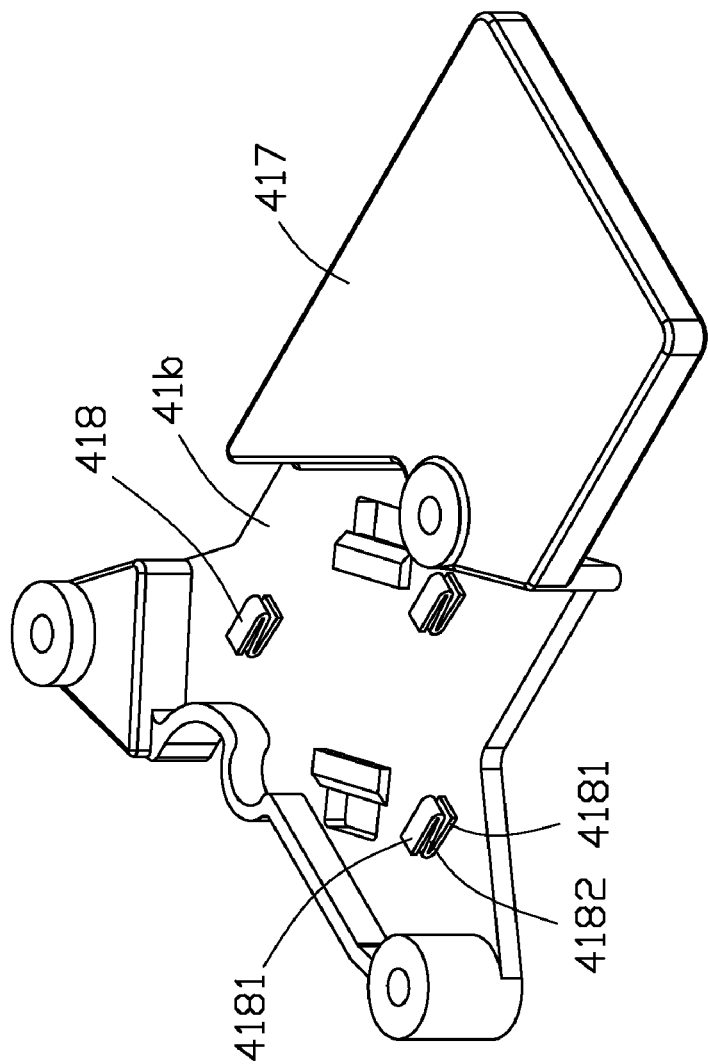
FIG. 7 is an isometric view of a securing plate of a thermal module according to a third embodiment of the present disclosure.

FIG. 7 shows a securing plate 41b of a thermal module according to a third embodiment of the present disclosure, differing from the securing plate 41a in the second embodiment in that the securing plate 41b has three resilient flakes 418 secured on a bottom surface thereof. The resilient flakes 418 are arranged at three corners of an imaginary triangle. Each of the resilient flakes 418 is substantially Z-shaped. The resilient flake 418 includes two flat portions 4181 spaced from and parallel to each other, and a connecting portion 4182 slantwise connected between opposite lateral sides of the two flat portions 4181. One of the flat portions 4181 is secured on the bottom surface of the securing plate 41b and the other one of the flat portions 4181 is configured to press the heat spreader 20 toward the electronic component 51. The connecting portion 4182 can deform resiliently between the two flat portions 4181.

It is to be understood that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing device comprising:
   a securing plate defining a plurality of securing holes;
   a plurality of fasteners extending through the securing holes, adapted for securing the securing plate to a substrate;
   at least three resilient flakes extending from the securing plate, the at least three resilient flakes being arranged at corners of a polygon, each of the at least three resilient flakes having a capability to deform resiliently along a direction perpendicular to the securing plate; and
   a heat spreader attached to the securing plate and being resiliently pushed by the at least three resilient flakes, the heat spreader being adapted for thermally engaging with a heat generating electronic component mounted on the substrate;
   wherein each of the at least three resilient flakes comprises two flat portions spaced from each other and a connecting portion connected between the two flat portions, one of the two flat portions is secured on the securing plate and the other one of the two flat portions presses on the heat spreader, and the connecting portion is resiliently deformable between the two flat portions.

2. The securing device of claim 1, wherein the securing plate has a plurality of sleeves extended perpendicularly downwardly, and each of the sleeves defines one of the plurality of securing holes therein, an inner diameter of the securing hole at a bottom end of the sleeve being smaller than that of another portion of the securing hole, a step being formed on an inner surface of the securing hole above the bottom end of the sleeve, each of the fasteners comprising a cap and a pole extending downwardly from the cap, and a diameter of the cap being larger than that of the pole.

3. The securing device of claim 1, wherein a heat dissipation plate is formed on a lateral side of the securing plate, the heat dissipation plate being parallel to the securing plate and lower than the securing plate, a plurality of heat dissipation pins being formed on a top surface of the heat dissipation plate, and a length of the heat dissipation pin being smaller than a distance between the securing plate and the heat dissipation plate.

4. A thermal module comprising:
   a fin assembly;
   a heat spreader;
   a heat pipe comprising an evaporation section and a condensation section at two opposite ends thereof, the evaporation section being attached to the heat spreader, the condensation section being attached to the fin assembly;
   a securing plate having at least three resilient members secured on a bottom surface thereof, each of the resilient members having a capability to deform resiliently along a direction perpendicular to the bottom surface of the securing plate to press on the heat spreader; and
   a heat dissipation plate formed on a lateral side of the securing plate, the heat dissipation plate being parallel to the securing plate and lower than the securing plate, a plurality of heat dissipation pins being formed on a top surface of the heat dissipation plate, a length of each of the heat dissipation pins being smaller than a distance between the securing plate and heat dissipation plate.

5. The thermal module of claim 4, wherein the resilient members are springs or resilient flakes.

6. The thermal module of claim 5, wherein the resilient members are springs, and each of the springs is coiled on a securing shaft which extends perpendicularly downwardly from the securing plate, the spring at a free status being longer than the securing shaft.

7. The thermal module of claim 5, wherein the resilient members are resilient flakes, and each of the resilient flakes includes two flat portions spaced from each other and a connecting portion connected between the two flat portions, the two flat portions abutting on the securing plate and the heat spreader respectively, and the connecting portion having a capability to deform resiliently.

8. The thermal module of claim 4, further comprising a plurality of fasteners, the securing plate defining a plurality of securing holes for receiving the fasteners.

9. The thermal module of claim 8, wherein the securing plate has a plurality of sleeves extended perpendicularly downwardly, and each of the sleeves defines one of the plurality of securing holes therein, an inner diameter of the securing hole at a bottom end of the sleeve being smaller than that of another portion of the securing hole, a step being formed on an inner surface of the securing hole above the bottom end of the sleeve, each of the fasteners comprising a cap and a pole extending downwardly from the cap, and a diameter of the cap being larger than that of the pole.

10. The thermal module of claim 4, wherein the resilient members are respectively arranged at corners of a polygon.

11. The thermal module of claim 4, wherein the heat spreader comprises two clasping flakes formed on two opposite lateral sides thereof, and the securing plate defines two clasping holes corresponding to the clasping flakes, the clasping flakes extending through the clasping holes and clasping on the securing plate.

12. The thermal module of claim 11, wherein each of the clasping flakes extends upwardly from the heat spreader and then bends downwardly slantways to a middle portion of the heat spreader to form a hook at a free end thereof, and the hooks can deform resiliently.

13. The thermal module of claim 12, wherein the clasping holes are rectangular and parallel to each other, a distance between inner lateral sides of the two clasping holes being no more than a distance between the two hooks, each of the clasping holes has a clasping portion extending into the clasping hole, a clasping surface being formed at a top end of the clasping portion, the clasping surface being lower than an upper surface of the securing plate, a distance between free ends of the two clasping portions being more than the distance between the two hooks, and each of the hooks extending in a corresponding clasping hole and clasping on the clasping surface of the clasping portion.

14. The thermal module of claim 13, wherein a slantwise surface is formed at the free end of each of the clasping portions, the slantwise surface slanting outwardly and upwardly from a bottom end to the top end of the clasping portion.

15. A securing device comprising: a securing plate defining a plurality of securing holes; a plurality of fasteners extending through the securing holes, and adapted for securing the securing plate to a substrate; at least three resilient members extending from the securing plate, the at least three resilient members being arranged at corners of a polygon, each of the at least three resilient members having a capability to deform resiliently along a direction perpendicular to the securing plate; and a heat spreader attached to the securing plate, the at least three resilient members being located between the securing plate and the heat spreader and resiliently pressing on the heat spreader, the heat spreader being adapted for thermally engaging with a heat generating electronic component mounted on the substrate, wherein the heat spreader comprises two clasping flakes formed on two opposite lateral sides thereof, each of the clasping flakes extends upwardly from the heat spreader and then bends downwardly slantways to a middle portion of the heat spreader to form a hook at a free end thereof, the hooks can deform resiliently, the securing plate defines two clasping holes corresponding to the clasping flakes, and the clasping flakes extend through the clasping holes with the hooks clasping on the securing plate.

16. The securing device of claim 15, wherein the at least three resilient members are springs, and each of the springs is coiled on a securing shaft which extends perpendicularly downwardly from the securing plate, the spring at a free status being longer than the securing shaft.

17. The securing device of claim 15, wherein the at least three resilient members are resilient flakes, and each of the resilient flakes includes two flat portions spaced from each other and a connecting portion connected between the two flat portions, the two flat portions abutting on the securing plate and the heat spreader respectively, and the connecting portion having a capability to deform resiliently.

18. The securing device of claim 15, wherein the clasping holes are rectangular and parallel to each other, a distance between inner lateral sides of the two clasping holes is no more than a distance between the two hooks, each of the clasping holes has a clasping portion extending into the clasping hole, a clasping surface is formed at a top end of the clasping portion, the clasping surface is lower than an upper surface of the securing plate, a distance between free ends of the two clasping portions is more than the distance between the two hooks, and each of the hooks extends in a corresponding clasping hole and clasps on the clasping surface of the clasping portion.

19. The securing device of claim 18, wherein a slantwise surface is formed at the free end of each of the clasping portions, the slantwise surface slanting outwardly and upwardly from a bottom end to the top end of the clasping portion.

* * * * *